(No Model.) 2 Sheets—Sheet 1.
E. THOMSON.
ELECTRIC RAILWAY CONDUCTOR.
No. 431,414. Patented July 1, 1890.
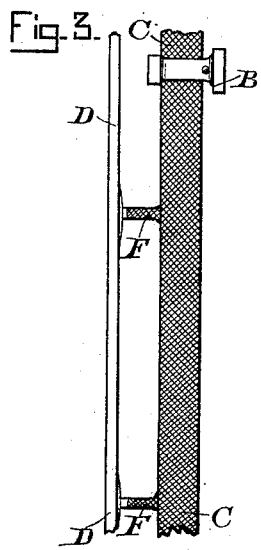
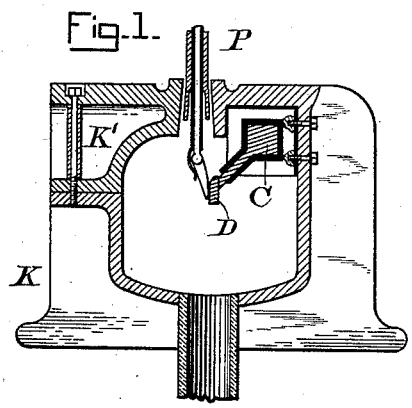
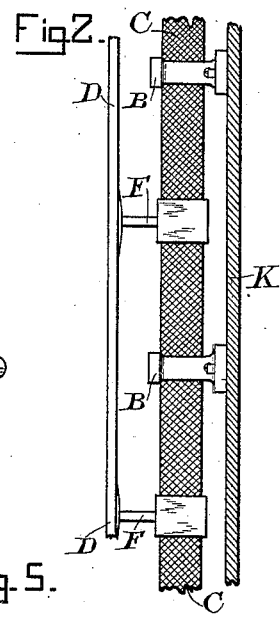
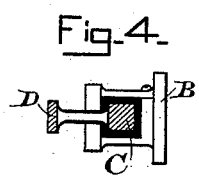
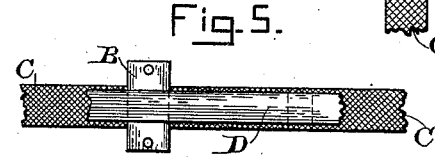
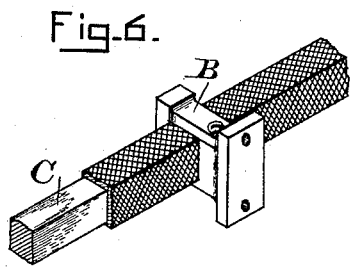
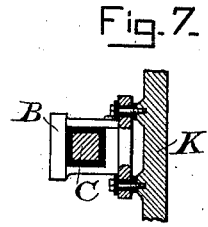
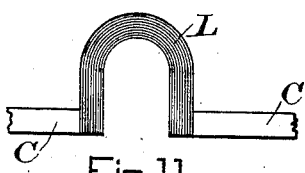
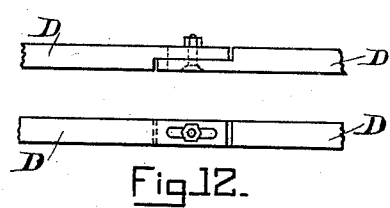
WITNESSES:
A. O. Orne
C. L. Haynes
INVENTOR
Elihu Thomson
BY Berkley Knight
ATTORNEY.

(No Model.) 2 Sheets—Sheet 2.

E. THOMSON.
ELECTRIC RAILWAY CONDUCTOR.

No. 431,414. Patented July 1, 1890.

WITNESSES:

INVENTOR
Elihu Thomson
BY Bentley Knight
ATTORNEY.

UNITED STATES PATENT OFFICE.

ELIHU THOMSON, OF LYNN, MASSACHUSETTS.

ELECTRIC-RAILWAY CONDUCTOR.

SPECIFICATION forming part of Letters Patent No. 431,414, dated July 1, 1890.

Application filed March 22, 1890. Serial No. 344,937. (No model.)

*To all whom it may concern:*

Be it known that I, ELIHU THOMSON, a citizen of the United States, residing at Lynn, county of Essex, State of Massachusetts, have invented certain new and useful Improvements in Electric-Railway Conductors, of which the following is a specification.

My invention relates to improvements in the arrangement of conductors and appliances for feeding current to vehicles propelled by electric motors.

Some parts of the invention are equally applicable to underground or overhead construction.

My invention consists, particularly, in forming the feeding-conductor for the current, insulating the same, and establishing branch connections at intervals therefrom, which support the bare conductor traversed by the contact device, while the insulated conductor is in turn supported at points entirely distinct and away from those portions of its length which support the bare conductor, the design being to secure the highest possible insulation and prevention of leakage. By this means the main conductor, being covered with insulation throughout, serves at the same time as an insulator for the contact-conductor. This principle can be applied equally to overhead construction as well as conductors in underground conduits with a slot. In carrying this part of my invention into practice I establish a line insulated throughout its length, with the exception of the ends of branches which carry the bare contact-conductor at a short distance from the insulated conductor. I also establish points at which the insulated conductor will be embraced or supported by brackets or insulators attached either to the sides of the conduit or in any other way to support the conductor. Such insulators or brackets are preferably made of insulating material, so as to insure as far as possible the preservation of the insulation of the line.

My invention further relates to certain minor arrangements in connection with the use of such a conductor in underground conduits, and will be understood by reference to the drawings.

Figure 1 is a sectional view of a conduit constructed in accordance with and embodying my improvements. Fig. 2 is a top view of the conductor, composed of the bare contact-conductor and the insulated conductor. Fig. 3 is another view with modifications. Fig. 4 is a section of the conductor of Fig. 3, showing the insulating support or bracket. Fig. 5 is an elevation of the contact or a portion of it. Figs. 6, 7, 8, 9, 10, 11, and 12 are details of parts of the apparatus working in conjunction with the former.

In Fig. 1 K is a conduit constructed of metal—such as cast-iron or other resisting material—which can be laid in the roadway flush at its upper surface and provided with a longitudinal slot for the traverse of the contact-making device on a vehicle, indicated at P. The conduit is preferably made in sections, at least one of which is movable, as K', by unbolting and lifting, so that access may be had to the interior. The conduit should be constructed to be drained, and be as nearly rigid as possible under the strains coming upon the road-bed. In the interior of the conduit is placed, preferably at its higher point and under a depending lip on the sides of the slot, a conductor for carrying currents, (indicated at C,) which carries by short branches or arms the bare and uninsulated surface or conductor D, upon which the plow P bears during use. The conductor C is insulated throughout its length, except at the points of attachment of the bare conductors D, the insulation being made substantial, as by a heavy braiding saturated with water-proofing materials, in order that it may remain as far as possible free from leak.

Fig. 2 shows in general one way of arranging the conductor, K representing that side of the conduit which supports the conductor, and C C the conductor itself, while D D is the bare or exposed conductor supported from the conductor C C. The conductor C C is insulated, as shown, and supported by split brackets or clamps B B, embracing, or carrying the conductor without the removal of its insulating material. The brackets B B can be made of metal or metal enameled, but are preferally made of such an insulating material as strong pottery or porcelain. Their design is to support the conductor C C at points irrespective of the points which support the bare conductor D D, which, as shown, is carried by branches F F from the main conductor and attached thereto, and making electrical contact therewith. By this construction it will be seen that leakage from the bare conductor or exposed portions will be required to traverse a long insulating-space, in order to reach the conduit—that is, it must traverse all that length of the insulating material outside of the conductor C C between the points of attachment of the bare conductor D D and the brackets B B, and if the brackets are made of insulating material it would still further have to traverse this insulating-clamp in getting to the conduit side.

I have shown in Fig. 1 but a single conductor, it being designed that the system shall be applicable to the case where the current returns through the conduit itself or through a metallic structure laid in the ground, a single insulated conductor being used to carry the current to the vehicles; but it will be understood that the same principles may be applied to conduits containing two conductors mounted suitably within the same.

In Fig. 3 the insulating-conductor is again shown with its branches F F for carrying the bare conductor D D; but the insulation in this case covers also the branches F F as well as the main conductor, so that the main conductor forms a straight unbroken line, to which the conductor D D is attached by studs covered with insulation, the clamping piece or support B B being used as before.

Fig. 4 is a section of the structure Fig. 3.

Fig. 5 is a face view of a structure similar to Figs. 2 or 3, where the parts are similarly related.

Fig. 6 is an isometrical view of the conductor C, its insulating material applied thereto, and the supporting and insulating clamps B around or outside the insulation.

Fig. 7 shows a section of the conductor and a portion of the bracket or clamp B, the bracket itself being insulated from the side of the conduit K, in which case the bracket may be made of metal—such as iron or brass—coated in some cases with enamel.

Figure 8:
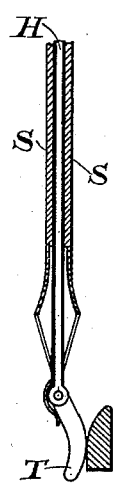
Figure 10:
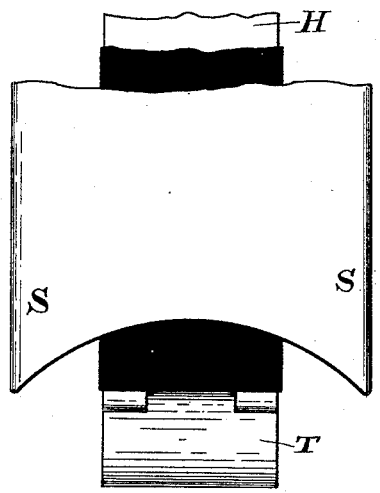

Fig. 8 is a section of a plow suitable for use with the conduit. It is constructed outside of steel plates S S, supported from the inner conducting-sheet H and insulated therefrom by a layer of mica or other resisting non-combustible insulator. The steel plates S S are preferably flared below laterally to the form shown in Fig. 10 for the purpose of providing a drip, which will prevent water reaching the conducting-surface, the insulating material being shown in black. Any suitable contact device may be used at the lower end of the plow or contact mechanism, as a shoe T, turned laterally by a spring and hinged to the conducting portion H.

Figure 9:
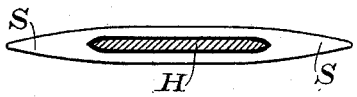

Fig. 9 shows the preferred section to be given to the plow, the dotted interior showing the conducting portion for carrying the current. The black line surrounding the interior H is to represent mica or other insulation around the portion H, the outside portion being the steel sheath for resisting lateral wear on the slot and for guiding the plow. These are details for rendering my invention serviceable in practice.

Fig. 11 simply shows a device for compensating for expansion in the main supply-conductor C C. It consists of a laminated portion, which is bent aside from the main course, so that a certain longitudinal expansion or contraction may occur in the conductor C C and be taken up by the yielding of the laminated portion L. In the same manner the conductor D D is able to expand, the motion being taken up by the expansion-joints seen in Fig. 12. These joints are formed by overlapping the ends of the conductor, slotting one of them, and bolting them together in the manner shown, the head of the bolt being held in a countersunk portion, so as not to engage with the traveling contact of the vehicle.

When my conductor composed of the insulated portion holding the bare conductor is applied to overhead work, it is only necessary to sustain the insulated conductor by span wires of the overhead structure at some point in its length at which the insulation is preserved, and at points different from those at which the bare conductor is attached, the difference from its use in a conduit being merely in the support which in this case is found in the span wires instead of the brackets attached to the sides of the conduit. It will be evident how this may be carried into practice without a full description. This part of my invention and improvements, in making it suitable for other purposes besides the mere insulation of the conductor, I have reserved for a separate application for patent filed herewith.

What I claim as new, and desire to secure by Letters Patent, is—

1. The combination, with a contact-conductor for an electric railway, of an insulating-piece extending parallel therewith and supported at intervals, and connections between the said conductor and the said insulating-piece at points between the supports of the latter, whereby the insulating-surface for the said conductor extends from its points of attachment on the insulating-piece to the points of support of the latter.

2. In an electric railway, a main conductor insulated throughout, supports therefor, and a bare conductor insulated by attachments to the main conductor at points between the supports thereof.

3. In an electric railway, a contact-conductor supported at intervals from a main conductor which is insulated throughout its length and is itself supported by insulators placed at intervals.

4. In an electric railway, an inclosing conduit, a main conductor therein insulated throughout its length, insulating-supports placed at intervals, and a bare contact-conductor supported from said main conductor by connections therefrom at points between its supports.

5. A compound conductor for electric railways, consisting of a conductor insulated throughout its length, a second conductor attached to the former by electric connections, such second conductor having a bared portion or surface suitable for making electric connection with a moving contact device, both conductors being arranged to form practically a rigid structure, and means for supporting said insulated conductor between the points of electric attachment of the bare conductor, as described.

6. A compound conductor for use with a traveling contact, consisting of a conductor with a bare surface, supported and carried by projections or extensions from a parallel conductor insulated throughout, such insulated conductor in turn being supported at points a considerable distance away from the branches or supports of the bared conductor so as to interpose a large surface of insulation between the sets of supports.

7. A contact device for a conduit electric railway having protecting sides expanded within the conduit to form a water-shed over the insulated contact-piece.

8. A contact device for a conduit electric railway having an insulated contact-piece at its lower end and a water-shed above said contact-piece.

9. A contact device for a conduit electric railway having a protecting-casing provided with a depending portion before and behind.

10. A contact device for an electric railway having a protecting-casing forming a water-shed at its lower end and an insulated contact-piece below said water-shed.

ELIHU THOMSON.

Witnesses:
JOHN W. GIBBONEY,
W. J. PLUMSTEAD.